United States Patent
Zhu et al.

(10) Patent No.: US 8,677,137 B2
(45) Date of Patent: Mar. 18, 2014

(54) COMMUNICATION DEVICE, COMMUNICATION METHOD, INFORMATION PROCESSING DEVICE, INFORMATION PROCESSING METHOD, PROGRAM, AND COMMUNICATION SYSTEM

(75) Inventors: Yinglin Zhu, Tokyo (JP); Mitsuhiro Nakamura, Tokyo (JP); Yasumasa Nakatsugawa, Kanagawa (JP); Toshimitsu Higashikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/840,514

(22) Filed: Jul. 21, 2010

(65) Prior Publication Data

US 2011/0078455 A1  Mar. 31, 2011

(30) Foreign Application Priority Data

Sep. 25, 2009  (JP) ................ P2009-221300

(51) Int. Cl.
*G06F 21/00* (2013.01)
(52) U.S. Cl.
USPC ............ 713/182; 713/183; 713/184; 713/185
(58) Field of Classification Search
USPC ................................ 713/182–185
See application file for complete search history.

(56) References Cited

U.S. PATENT DOCUMENTS

| 7,757,101 | B2* | 7/2010 | Nonaka et al. ............... 713/194 |
| 2002/0056747 | A1* | 5/2002 | Matsuyama et al. .......... 235/382 |
| 2002/0129250 | A1 | 9/2002 | Kimura |
| 2009/0159666 | A1* | 6/2009 | O'Brien et al. ............... 235/380 |

FOREIGN PATENT DOCUMENTS

| EP | 1760671 A1 | 3/2007 |
| GB | 2398152 A | 8/2004 |
| JP | 10-327142 | 12/1998 |
| JP | 2008-099335 | 4/2008 |

OTHER PUBLICATIONS

European Search Report dated Aug. 12, 2010 for corresponding European Appl. No. 10177027.9-2221.

* cited by examiner

*Primary Examiner* — Ghazal Shehni
(74) *Attorney, Agent, or Firm* — K&L Gates LLP (57) ABSTRACT

In one example embodiment, an information processing apparatus determines whether a target ID is a unique ID or a partial randomization ID that includes a first part being replaced by a different number and a second part being generated based on the unique ID. In response to the target ID being the partial randomization ID, the information processing apparatus generates an access key based on the second part of the partial randomization ID and a key. The information processing apparatus executes a mutual authentication process using the generated access key.

25 Claims, 7 Drawing Sheets

FIG.8

COMMUNICATION DEVICE, COMMUNICATION METHOD, INFORMATION PROCESSING DEVICE, INFORMATION PROCESSING METHOD, PROGRAM, AND COMMUNICATION SYSTEM

CROSS REFERENCES TO RELATED APPLICATIONS

The present application claims priority to Japanese Patent Application No. JP 2009-221300, filed in the Japanese Patent Office on Sep. 25, 2009, the entire contents of which is being incorporated herein by reference.

BACKGROUND

In the related art, non-contact communication systems represented by FeliCa (registered trademark of Sony Corporation) are widely being supplied.

The non-contact communication system includes a reader/writer (hereinafter, abbreviated as R/W) and a non-contact communication IC card (hereinafter, abbreviated as IC card). The non-contact communication system communicates information using electromagnetic waves between the R/W and the IC card in a non-contact type. Before various types of information are communicated, a mutual authentication process is executed. In place of the IC card, a mobile phone or the like is used in which an IC chip having the same function as the IC card has been built.

For example, information regarding a plurality of services such as an electronic money service, a commutation ticket service for an electric train or the like, and an employee ID card service is capable of being mounted on one IC card.

The access right or access method for user data within the IC card is controlled in a service unit. There is a key by which user data for each service is accessed. The right of access to user data corresponding to a T9 service is controlled by the above-described key. For each service, an access method is prescribed for use in a history data write method or an electronic money subtraction method.

To once execute a history data write process and an electronic money subtraction process, one key (degenerate key) is generated from keys of a plurality of services. It is possible to access the plurality of services by one mutual authentication process using the degenerate key. In this regard, it is possible to have access by executing a mutual authentication process using a key held for each service even in individual services.

In this regard, a mutual authentication process for each service is necessary to use a plurality of different services, that is, to access information regarding each service. When the mutual authentication process is executed using a different key for each service, the process becomes troublesome. Therefore, a technique has been implemented in which one key (degenerate key) is generated in advance on the basis of a plurality of keys respectively corresponding to services, and the degenerate key is commonly used in mutual authentication processes for the services (for example, see JP-A-10-327142).

When the above-described degenerate key is used, it is possible to reduce the time taken for the mutual authentication process and it is possible to quickly access information regarding a desired service.

However, for example, when a degenerate key is leaked in a situation where a plurality of IC cards uses a common degenerate key, it is necessary to change the common degenerate key held on the plurality of IC cards. Therefore, a method has been proposed for individualizing and using a degenerate key for each IC card by applying unique identification information (hereinafter, referred to as unique ID) of each IC card to a degenerate key without directly using the degenerate key (for example, see JP-A-2008-99335).

SUMMARY

The present disclosure relates to a communication device, a communication method, an information processing device, an information processing method, a program, and a communication system, and more particularly to a communication device, a communication method, an information processing device, an information processing method, a program, and a communication system, which are suitable for use in the case where information is communicated in a non-contact type.

After individualization by applying a unique ID of an IC card to a degenerate key as described above, the leakage of the degenerate key itself can be prevented by using the individualization result in a mutual authentication process. However, in this case, it is difficult to deny a possibility that the unique ID of the IC card may be leaked to the third party in a notification process since it is necessary for the IC card to notify the R/W of its own unique ID.

It is necessary for the unique ID of the IC card to be prevented from being leaked since there is a possibility that the leaked unique ID of the IC card may be used in an unauthorized identification tracking process for a user of the IC card.

Thus, it is desirable to prevent a unique ID of an IC card from being leaked even though a degenerate key is individualized and used.

The present disclosure provides a new and innovative information processing apparatus, method and computer readable memory device for preventing a unique ID from being leaked.

In an example embodiment, the information processing apparatus includes a processor; a communication section operatively coupled to the processor; and a memory device operatively coupled to the processor, the memory device storing instructions that cause the processor, in cooperation with a communication section and a memory device, to: determine whether a target ID is a unique ID or a partial randomization ID, the partial randomization ID including a first part being replaced by a different number and a second part being generated based on the unique ID; in response to the target ID being the partial randomization ID, generate an access key based on the second part of the partial randomization ID and a key; execute a mutual authentication process using the generated access key.

In an example embodiment, the information processing apparatus is a reader/writer. In another example embodiment, the information processing apparatus is a non-contact communication card.

In an example embodiment, the instructions cause the processor to determine whether the target ID is the unique ID or the partial randomization ID based on a randomization flag.

In an example embodiment, the target ID includes a code. In this example embodiment, the instructions cause the processor, to determine whether the target ID is the unique ID or the partial randomization ID based on the code.

In an example embodiment, the different number which replaces the first part of the partial randomization ID is randomly generated. In an example embodiment, the instructions cause the processor to change the randomly generated different number.

In an example embodiment, the second part of the partial randomization ID includes a part of the unique ID.

In an example embodiment, in response to the target ID being the partial randomization ID, the instructions cause the processor to generate the access key by applying the second part of the partial randomization ID to the key. In an example embodiment, applying the second part of the partial randomization ID to the key includes adding the second part of the partial randomization ID to the key.

In an example embodiment, in response to the target ID being the unique ID, the instructions cause the processor to generate the access key by applying the unique ID to the key.

In an example embodiment, a method of operating an information processing apparatus including instructions includes: (a) causing a processor to execute the instructions to determine whether a target ID is a unique ID or a partial randomization ID, the partial randomization ID including: (i) a first part being replaced by a different number; and (ii) a second part being generated based on the unique ID; (b) causing the processor to execute the instructions to, in response to the target ID being the partial randomization ID, generate an access key based on the second part of the partial randomization ID and a key; and (c) causing the processor to execute the instructions to execute a mutual authentication process using the generated access key.

In an example embodiment, the information processing apparatus is a reader/writer. In another example embodiment, the information processing apparatus is a non-contact communication IC card.

In an example embodiment, the method includes causing the processor to execute the instructions to determine whether the target ID is the unique ID or the partial randomization ID based on a randomization flag.

In an example embodiment, the method includes: causing the processor to execute the instructions to determine whether the target ID includes a code; and causing the processor to execute the instructions to determine whether the target ID is the unique ID or the partial randomization ID based on the code.

In an example embodiment, the different number is randomly generated. In an example embodiment, the method includes causing the processor to execute the instructions to change the randomly generated different number.

In an example embodiment, the second part of the partial randomization ID includes a part of the unique ID.

In an example embodiment, the method includes causing the processor to execute the instructions to, in response to the target ID being the partial randomization ID, generate the access key by applying the second part of the partial randomization ID to the key. In an example embodiment, applying the second part of the partial randomization ID to the key includes adding the second part of the partial randomization ID to the key.

In an example embodiment, the method includes causing the processor to execute the instructions to, in response to the target ID being the unique ID, generate the access key by applying the unique ID to the key.

In an example embodiment, the computer readable memory stores instructions to cause an information processing apparatus to: (a) determine whether a target ID is a unique ID or a partial randomization ID, the partial randomization ID including: (i) a first part being replaced by a different number; and (ii) a second part being generated based on the unique ID; (b) in response to the target ID being the partial randomization ID, generate an access key based on the second part of the partial randomization ID and a key; and (c) execute a mutual authentication process using the generated access key.

In an example embodiment, the information processing apparatus is a reader/writer. In another example embodiment, the information processing apparatus is a non-contact communication card.

In an example embodiment, the instructions cause the information processing apparatus to determine whether the target ID is the unique ID or the partial randomization ID based on a randomization flag.

In an example embodiment, the target ID includes a code. In an example embodiment, the instructions cause the information processing apparatus to determine whether the target ID is the unique ID or the partial randomization ID based on the code.

In an example embodiment, the different number is randomly generated. In an example embodiment, the instructions cause the information processing apparatus to change the randomly generated different number.

In an example embodiment, the second part of the partial randomization ID includes a part of the unique ID.

Additional features and advantages are described herein, and will be apparent from the following Detailed Description and the figures.

DETAILED DESCRIPTION

Hereinafter, exemplary embodiments of the present disclosure will be described in detail with reference to the drawings.

1. Embodiment

[Configuration Example of Non-Contact Communication System]

Figure 1:
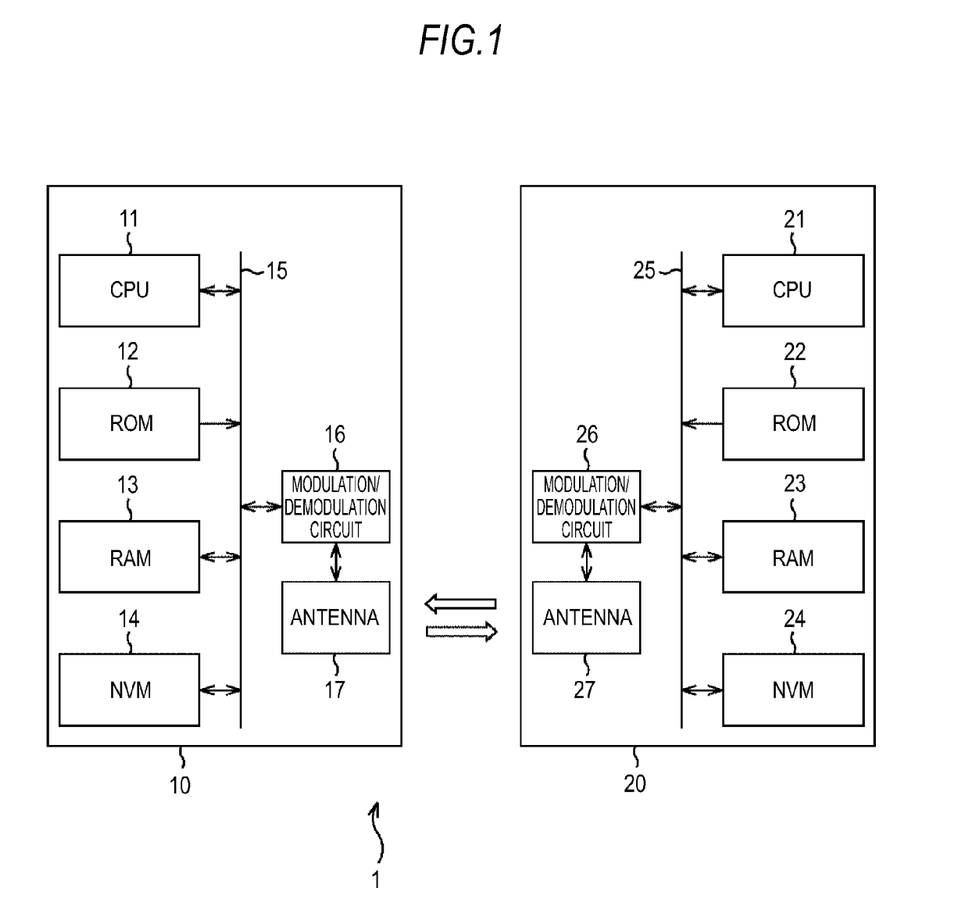
FIG. 1 is a block diagram showing a configuration example of a non-contact communication system according to an exemplary embodiment of the present disclosure.

FIG. 1 shows a configuration example of a non-contact communication system according to an exemplary embodiment of the present disclosure. This non-contact communication system 1 includes an R/W 10 and an IC card 20. When a user moves the IC card 20 toward the R/W 10, drive power is generated inside the IC card 20.

The R/W 10 has a built-in CPU 11 to which a ROM 12, a RAM 13, an NVM (non volatile memory) 14, and a modulation/demodulation circuit 16 are connected via a bus 15. The CPU 11 controls each element of the R/W 10 by executing a control program prestored in the ROM 12. The RAM 13 is used as a work area when the CPU 11 executes various processes. A degenerate key is held in the NVM 14.

The modulation/demodulation circuit 16 modulates a carrier by information, which is output from the CPU 11, input via the bus 15, and transmitted to the IC card 20, and outputs the modulated carrier to an antenna 17. Also, the modulation/ demodulation circuit 16 demodulates a received wave received by the antenna 17, and outputs information as the demodulation result from the IC card 20 to the CPU 11 via the bus 15. The antenna 17 transmits a modulated wave input from the modulation/demodulation circuit 16. Also, the antenna 17 receives a modulated wave transmitted from the IC card 20 and outputs the modulated wave to the modulation/demodulation circuit 16.

The IC card 20 has a built-in CPU 21 to which a ROM 22, a RAM 23, an NVM 24, and a modulation/demodulation circuit 26 are connected via a bus 25. The CPU 21 controls each element of the IC card 20 by executing a control program prestored in the ROM 22. The RAM 23 is used as a work area when the CPU 21 executes various processes. In the NVM 24, information regarding a degenerated key or various services (an electronic money service, a commutation ticket service for an electric train, an employee ID card service, and the like) is hierarchized and stored for each service.

The modulation/demodulation circuit 26 demodulates a carrier received by an antenna 27 from the R/W 10, and outputs information from the R/W 10 as the demodulation result to the CPU 21 via the bus 25. The modulation/demodulation circuit 26 modulates a carrier by information, which is output from the CPU 21, input via the bus 25, and transmitted to the R/W 10, and outputs the modulated carrier to the antenna 27. The antenna 27 receives a modulated wave transmitted from the R/W 10, outputs the modulated wave to the modulation/demodulation circuit 26. Also, the antenna 27 transmits a modulated wave input from the modulation/demodulation circuit 26.

Figure 2A:
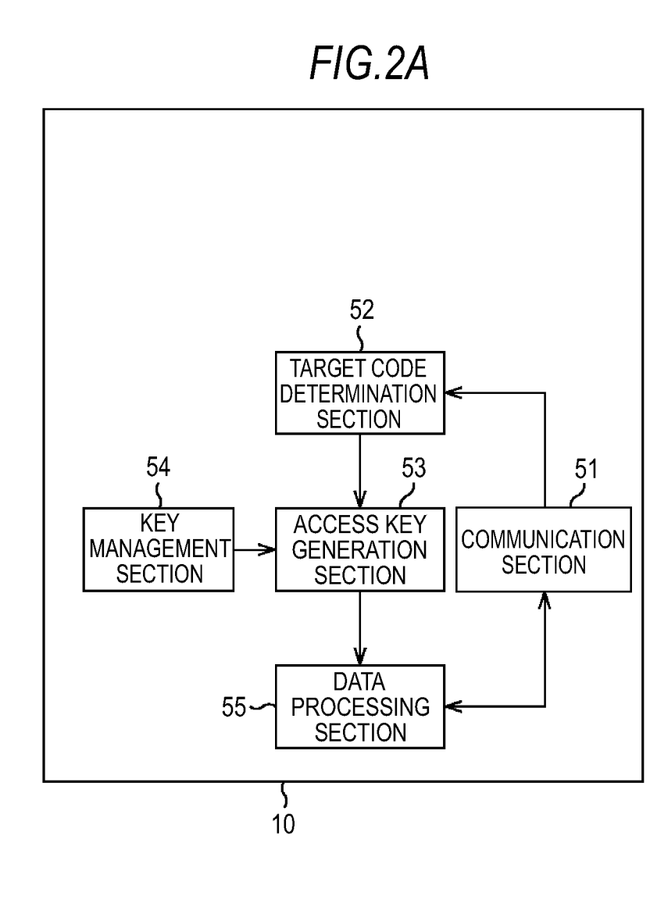
FIGS. 2A and 2B are block diagrams showing functional configuration examples of an R/W and an IC card.
Figure 2B:
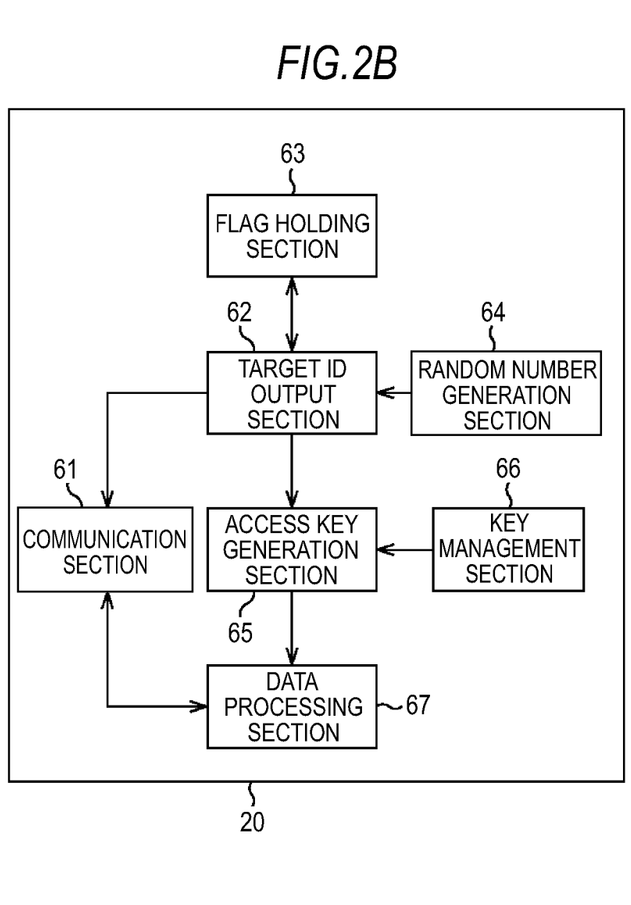

Next, FIGS. 2A and 2B show diagrams of functional blocks to be implemented by the control programs respectively executed by the CPU 11 of the R/W 10 and the CPU 21 of the IC card 20.

In the R/W 10, a communication section 51, a target code determination section 52, an access key generation section 53, a key management section 54, and a data processing section 55 are implemented.

The communication section 51 controls communication with the IC card 20. The target code determination section 52 reads a target code from a target ID reported from the IC card 20, and determines whether the target ID is a card-specific ID or a partial randomization ID.

The access key generation section 53 generates an access key by individualizing a degenerate key on the basis of the determination result of the target code determination section 52. A degenerate key individualization process will be described with reference to FIG. 4.

The key management section 54 manages a pre-held degenerate key and a generated access key. The data processing section 55 executes a mutual authentication process with the IC card 20 using the generated access key via the communication section 51. The data processing section 55 decrypts encrypted information transmitted from the IC card 20 or encrypts information to be transmitted to the IC card 20 after the mutual authentication process.

In the IC card 20, a communication section 61, a target ID output section 62, a flag holding section 63, a random number generation section 64, an access key generation section 65, a key management section 66, and a data processing section 67 are implemented.

The communication section 61 controls communication with the R/W 10. In response to the state of a flag held by the flag holding section 63, the target ID output section 62 outputs a card-specific ID or a partial randomization ID as a target ID, wherein the partial randomization ID is generated by replacing a part of the card-specific ID with a random number. The card-specific ID is prestored in the NVM 24. The partial randomization ID is generated by the target ID output section 62 at a predetermined timing, and is stored in the NVM 24. A partial randomization ID generation process will be described with reference to FIGS. 3A, 3B, and 3C.

In the flag holding section 63, a target ID randomization flag indicating whether to directly use a card-specific ID of the related art or to use a partial randomization ID as the target ID is preset. Hereinafter, the card-specific ID is directly used when the target ID randomization flag is invalid, and the partial randomization ID is used when the target ID randomization flag is valid.

That is, before the IC card 20 is provided to the user, it is determined whether to directly use the card-specific ID or to use the partial randomization ID as the target ID to be reported to the R/W 10.

In this regard, the validity/invalidity of the target ID randomization flag held in the flag holding section 63 can be switched in response to a predetermined command from the R/W 10.

Therefore, for example, the target ID randomization flag is set to be invalid so that the card-specific ID is reported as the target ID until the R/W 10 according to an exemplary embodiment of the present disclosure is widely supplied to the society. The target ID randomization flag is reset to be valid so that the partial randomization ID is reported as the target ID after the R/W of the related art is abolished and the R/W 10 is widely supplied to the society.

The random number generation section 64 generates a random number in response to a request from the target ID output section 62. The access key generation section 65 generates an access key by individualizing a degenerate key on the basis of a target code of the generated target ID at a predetermined timing. The key management section 66 manages the degenerate key pre-held in the NVM 24. A degenerate key individualization process will be described later with reference to FIG. 4.

The data processing section 67 executes a mutual authentication process with the R/W 10 using the generated access key via the communication section 61. After the mutual authentication process, the data processing section 67 decrypts encrypted information transmitted from the R/W 10 or encrypts information to be transmitted to the R/W 10.

The functional blocks shown in FIGS. 2A and 2B are implemented by software (control programs) as described above, but may be installed as hardware.

[In Terms of Partial Randomization ID]

Figure 3A:
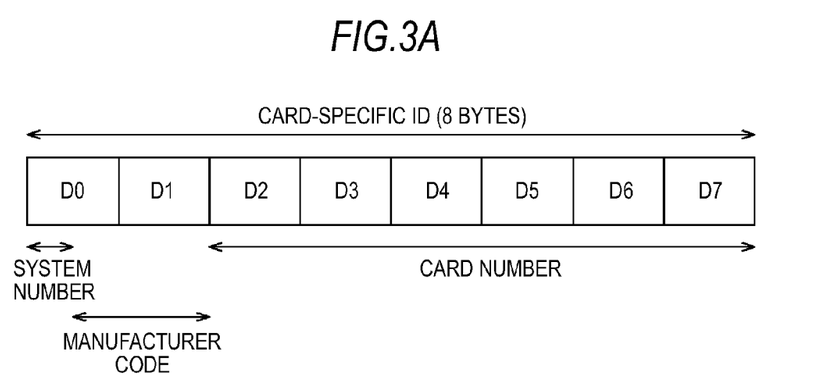
FIGS. 3A, 3B, and 3C are diagrams showing data structures of a target ID.
Figure 3B:
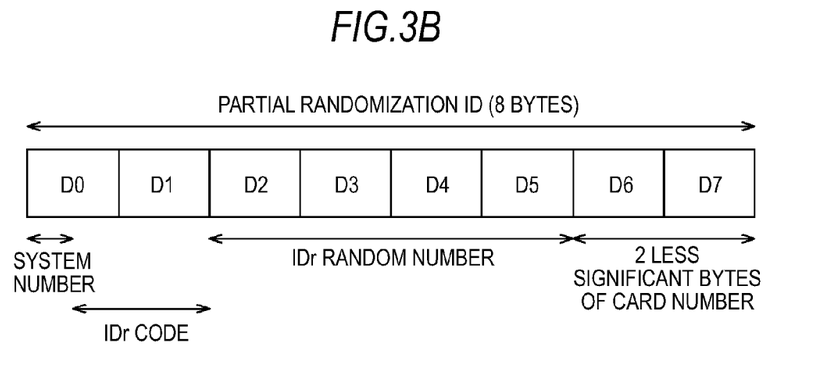
Figure 3C:
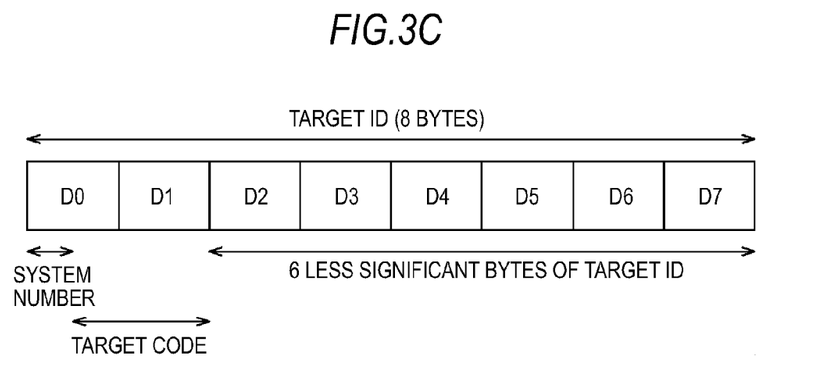

FIGS. 3A, 3B, and 3C are diagrams illustrating a process of generating a target ID by the target ID output section 62 of the IC card 20.

FIG. 3A shows a data structure of a card-specific ID pre-allocated to the IC card 20 and stored in the NVM 24 or the like. For example, the card-specific ID has an amount of information of 8 bytes D0 to D7 in which a 4-bit system number, a 12-bit manufacturer code, and a 6-byte card number are recorded in order from the MSB (Most Significant Bit) side. In IC cards 20 manufactured by the same manufacturer, the system number and the manufacturer code are common. Accordingly, the 6-byte card number becomes substantially unique information of the IC card 20.

FIG. 3B shows a data structure of a partial randomization ID generated from the target ID output section 62. That is, the partial randomization ID is obtained by replacing the manufacturer code of the card-specific ID with an IDr code including a predetermined value, and replacing predetermined n bytes (4 bytes in FIG. 3B) at the MSB side of the 6-byte card number with a random number generated by the random number generation section 64. Here, n is an integer which is equal to or greater than 1 and less than 6.

Therefore, when the card-specific ID of FIG. 3A or the partial randomization ID of FIG. 3B has been reported as the target ID from the IC card 20 to the R/W 10, it is possible to determine whether the target ID is the card-specific ID or the partial randomization ID by identifying the 12 bits subsequent to the system number.

As shown in FIG. 3C, 12 bits subsequent to the system number are referred to as a target code, and 6 bytes D2 to D7 subsequent thereto are referred to 6 less significant bytes of the target ID.

Though 4 bytes in the target ID are replaced with the random number in the above exemplary embodiment, the number of bytes that are replaced can be different. Also, the target code may include information indicative of which byte and how many bytes in the 6 less significant bytes of the target ID (D2-D7) are to be replaced with the random number. For example, it may be arranged that when 12 low bits of the target code are "2FEh", then the 4 bytes in the 6 less significant bytes of the target ID (D2-D5) are replaced with the random number and, as a result, the less significant 2 bytes (D6 and D7) of the target ID are the same as less significant 2 bytes of the card number. Also, it may be arranged that when 12 low bits of the target code are "2FFh", then the 3 bytes in the 6 less significant bytes of the target ID (D2-D4) are replaced with the random number and, as a result, the less significant 3 bytes (D5 and D7) of the target ID are the same as less significant 3 bytes of the card number.

[In Terms of Degenerate Key Individualization]

Figure 4:
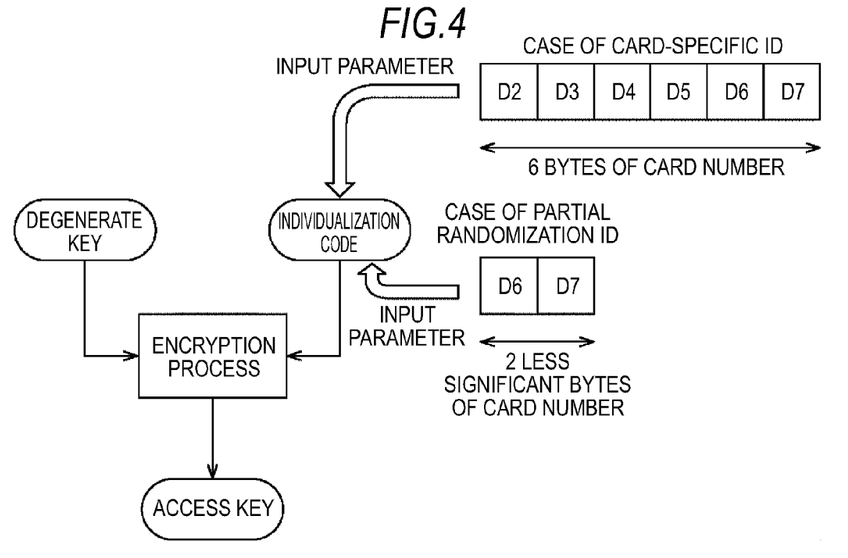
FIG. 4 is a diagram illustrating the individualization of a degenerate key.

FIG. 4 is a diagram illustrating degenerate key individualization to be executed in each of the access key generation key 53 of the R/W 10 and the access key generation section 65 of the IC card 20.

As shown in FIG. 4, the degenerate key individualization is executed by applying an individualization code to the degenerate key, for example, by adding the individualization code to the degenerate key. Hereinafter, the individualized degenerate key as the result of the individualization process is referred to as an access key.

Here, the individualization code is generated by an input parameter of the individualization code. In this regard, the input parameter may be directly used as the individualization code.

When the target ID is the card-specific ID, the 6 less significant bytes of the target ID, that is, a total of the card number, become the input parameter of the individualization code. When the target ID is the partial randomization ID, the (6-n) less significant bytes of the target ID, that is, the (6-n) less significant bytes of the card number excluding a random number part from the 6 less significant bytes of the target ID, become the input parameter of the individualization code. In FIG. 4, 2 less significant bytes D6 and D7 of the target ID become the input parameter of the individualization code when the target ID is the partial randomization ID.

[Operation Description of Non-Contact Communication System 1]

Figure 5:
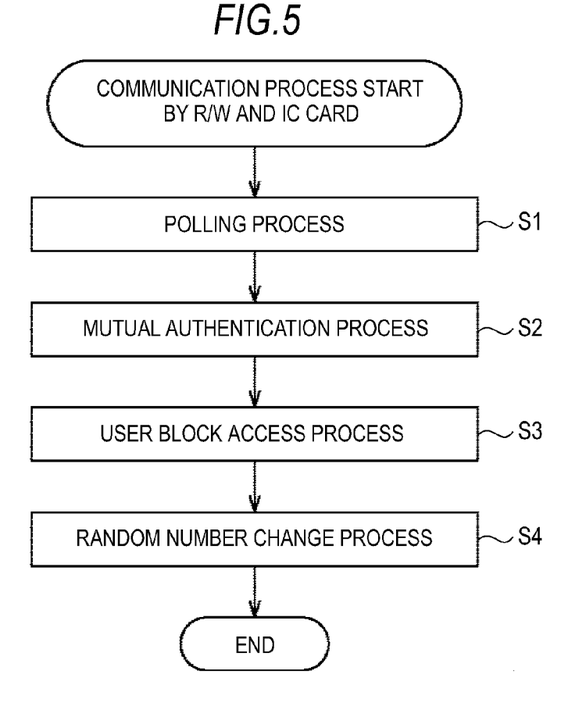
FIG. 5 is a flowchart illustrating a communication process by the R/W and the IC card of FIGS. 2A and 2B.

Next, the outline of a communication process by the non-contact communication system 1 will be described. FIG. 5 is a flowchart illustrating the communication process by the non-contact communication system 1.

Initially, a polling process is executed in step S1. That is, when the R/W 10 executes the polling process for searching for the IC card 20 as a communication partner, the IC card 20 reports its own target ID (the partial randomization ID or the card-specific ID) to the R/W 10 in response thereto.

In step S2, a mutual authentication process is executed. That is, the R/W 10 obtains an access key as the result of executing an individualization process in which an individualization code is extracted from the target ID reported from the IC card 20 and is applied to the degenerate key. On the other hand, the IC card 20 obtains an access key as the result of executing an individualization process in which an individualization code is extracted from the target ID reported to the R/W 10 and is applied to the degenerate key. Thereby, since the R/W 10 and the IC card 20 obtain the same access key, the mutual authentication process is executed using the same access key.

In step S3, a user block access process is executed. That is, the R/W 10 executes a process of reading information recorded on the IC card 20, rewriting information recording on the IC card 20, or writing new information on the IC card 20 according to an instruction from a controller (not shown).

In step S4, a random number change process is executed. The random number change process is executed by the IC card 20 according to a predetermined command from the R/W 10 only when the IC card 20 is set to report the partial randomization ID as the target ID. Specifically, a process of updating the partial randomization ID is executed by changing a random number included in the partial randomization ID as the target ID.

The random number change process of step S4 may not be necessarily executed at every time when the communication process is executed. That is, the R/W 10 causes the IC card 20 to execute the random number change processing the above-described predetermined command as necessary.

Operation Description of IC Card 20

Figure 6:
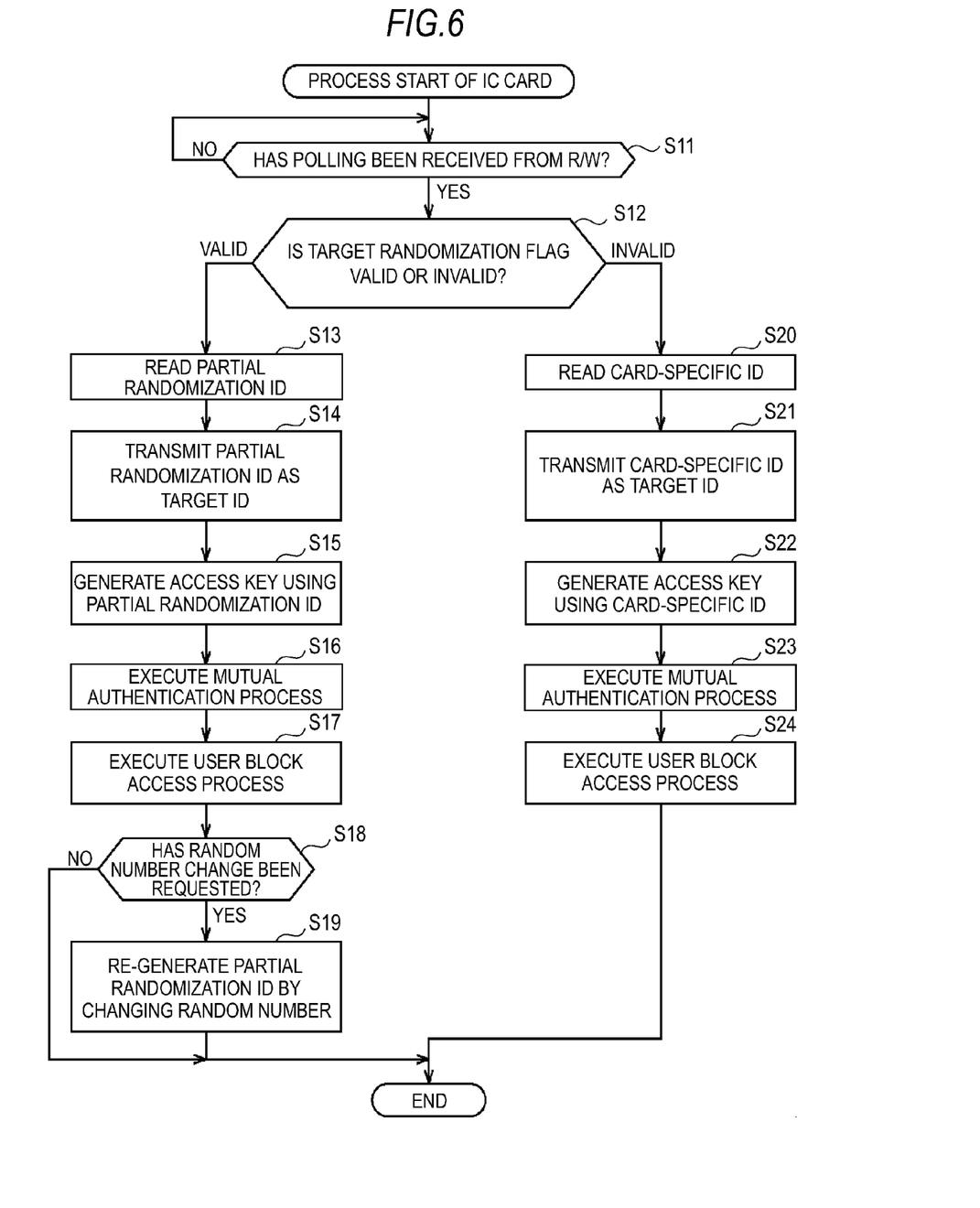
FIG. 6 is a flowchart illustrating a process of the IC card of FIG. 2B.

Next, the process of the IC card 20 in the communication process will be described in detail. FIG. 6 is a flowchart illustrating the process of the IC card 20. This process is started when drive power has been generated inside the IC card 20 by the user moving the IC card 20 toward the R/W 10.

In the IC card 20, the partial randomization ID already generated by the target ID output section 62 is held in the NVM 24.

In step S11, the communication section 61 of the IC card 20 waits for polling to be received from the R/W 10. When the polling has been received, the process proceeds to step S12.

In step S12, the target ID output section 62 determines the state of the target ID randomization flag held by the flag holding section 63. Here, when the target ID randomization flag has been determined to be valid, the process proceeds to step S13 and subsequent steps and the partial randomization ID is reported as the target ID to the R/W 10.

That is, in step S13, the target ID output section 62 reads the previously generated partial randomization ID stored in the NVM 24 and outputs the read ID to the communication section 61 and the access key generation section 65. Here, it is assumed that the partial randomization ID is already generated. However, when the partial randomization ID is not generated on any reason, it is desirable to generate the partial randomization ID in step S13.

In step S14, the communication section 61 provides the R/W 10 with the partial randomization ID as the target ID input from the target ID output section 62.

In step S15, the access key generation section 65 generates the access key by causing the key management section 66 to read the degenerate key and applying 2 less significant bytes of the card number of the partial randomization ID input from the target ID output section 62 to the read degenerate key.

In step S16, the data processing section 67 executes the mutual authentication process with the R/W 10 using the generated access key via the communication section 61. After the mutual authentication process has succeeded, the data processing section 67 executes the user block access process in step S17. That is, information is read from, or written to, the NVM 24 in response to a request from the R/W 10.

In step S18, the target ID output section 62 determines whether a random number change command has been transmitted from the R/W 10. The process proceeds to step S19 at the time of determining that the random number change command has been transmitted. In step S19, the target ID output section 62 causes the random number generation section 64 to generate a random number and re-generates a partial randomization ID by replacing a random number part of the current partial randomization ID with the generated random number, and causes the NVM 24 to store the re-generated partial randomization ID. Here, the re-generated partial randomization ID is used as the target ID reported from the IC card 20 to the R/W 10 at the time of the next communication process. Then, the process of the IC card 20 is ended.

On the other hand, when the target ID randomization flag has been determined to be invalid in step S12, the process proceeds to step S22 and subsequent steps. The card-specific ID as the target ID is reported to the R/W 10.

That is, in step S20, the target ID output section 62 reads the card-specific ID stored in the NVM 24 and then outputs the read card-specific ID to the communication section 61 and the access key generation section 65.

In step S21, the communication section 61 provides the R/W 10 with the card-specific ID input from the target ID output section 62 as the target ID.

In step S22, the access key generation section 65 generates the access key by causing the key management section 66 to read the degenerate key and applying the 6-byte card number of the card-specific ID input from the target ID output section 62 to the read degenerate key, and outputs the generated access key to the data processing section 67.

In step S23, the data processing section 67 executes the mutual authentication process with the R/W 10 using the generated access key via the communication section 61. After the mutual authentication process has succeeded, the data processing section 67 executes the user block access process in step S17. Then, the process of the IC card 20 is ended.

Then, the description of the process of the IC card 20 is ended.

A process of determining whether the target ID randomization flag is valid or invalid every time when polling is received has been described above. Alternatively, the determination process may be omitted by associating in advance the partial randomization ID or the card-specific ID with the target ID.

A process of reading and reporting the partial randomization ID generated and stored in advance when the partial randomization ID as the target ID is reported to the R/W 10 has been described above. Alternatively, the random number may be generated to generate the partial randomization ID at every report.

When the target ID randomization flag held in the flag holding section 63 of the IC card 20 is set to be valid as described above, the partial randomization ID as the target ID is reported from the IC card 20 to the R/W 10. Therefore, the leakage of the card-specific ID of the IC card 20 can be prevented.

[Operation Description of R/W 10]

Figure 7:
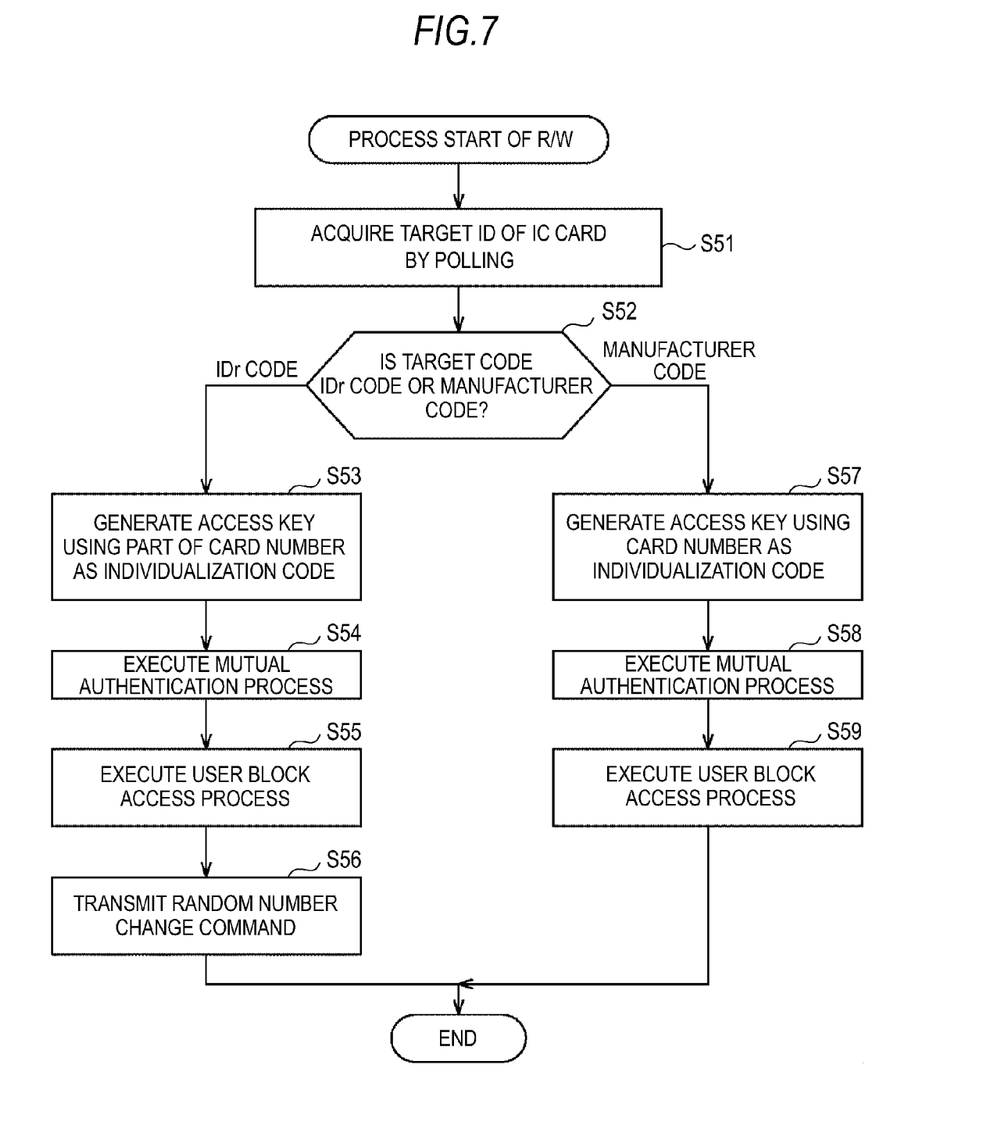
FIG. 7 is a flowchart illustrating a process of the R/W of FIG. 2A.

Next, the process of the R/W 10 in the communication process will be described in detail. FIG. 7 is a flowchart illustrating the process of the R/W 10. This process is started under control from a controller (not shown).

In step S51, the communication section 51 of the R/W 10 performs polling. A target ID is acquired from the IC card 20 moving toward the R/W 10. The acquired target ID is output to the target code determination section 52.

In step S52, the target code determination section 52 determines whether a target code of the target ID is an IDr code or a manufacturer code, and reports the target ID to the access key generation section 53 with the determination result. Here, when the target code has been determined to be the IDr code, the process proceeds to step S53. In this case, the target ID reported from the IC card 20 is a partial randomization ID.

In step S53, the access key generation section 53 generates an access key by causing the key management section 54 to read a degenerate key and applying 2 less significant bytes of a card number of the target ID (partial randomization ID) as an input parameter of an individualization code to the read degenerate key, and outputs the generated access key to the data processing section 55.

In step S54, the data processing section 55 executes a mutual authentication process with the IC card 20 using the generated access key via the communication section 51. After the mutual authentication process has succeeded, the data processing section 55 executes the user block access process in step S55. That is, information is read from, or written to, the IC card 20.

In step S56, the communication section 56 transmits a random number change command to the IC card 20. In response to the random number change command, the IC card 20 re-generates the partial randomization ID. The process of step S56 may be omitted. Alternatively, for example, the random number change command may be transmitted only when a communication process has been executed in a predetermined time band. Then, the process of the R/W 10 is ended.

In step S52, when the target code has been determined to be the manufacturer code, the process proceeds to S57. In this case, the target ID from the IC card 20 is a card-specific ID.

In step S57, the access key generation section 53 generates an access key by causing the key management section 54 to read the degenerate key and applying 6 bytes of the card number of the target ID (card-specific ID) as the input parameter of the individualization code to the read degenerate key, and outputs the generated access key to the data processing section 55.

In step S58, the data processing section 55 executes the mutual authentication process with the IC card 20 using the generated access key via the communication section 51. After the mutual authentication process has succeeded, the data processing section 55 executes the user block access process in step S59. That is, information is read from, or written to, the IC card 20. Then, the process of the R/W 10 is ended.

[Description for Operation of R/W of Related Art which Communicates with IC Card 20]

Figure 8:
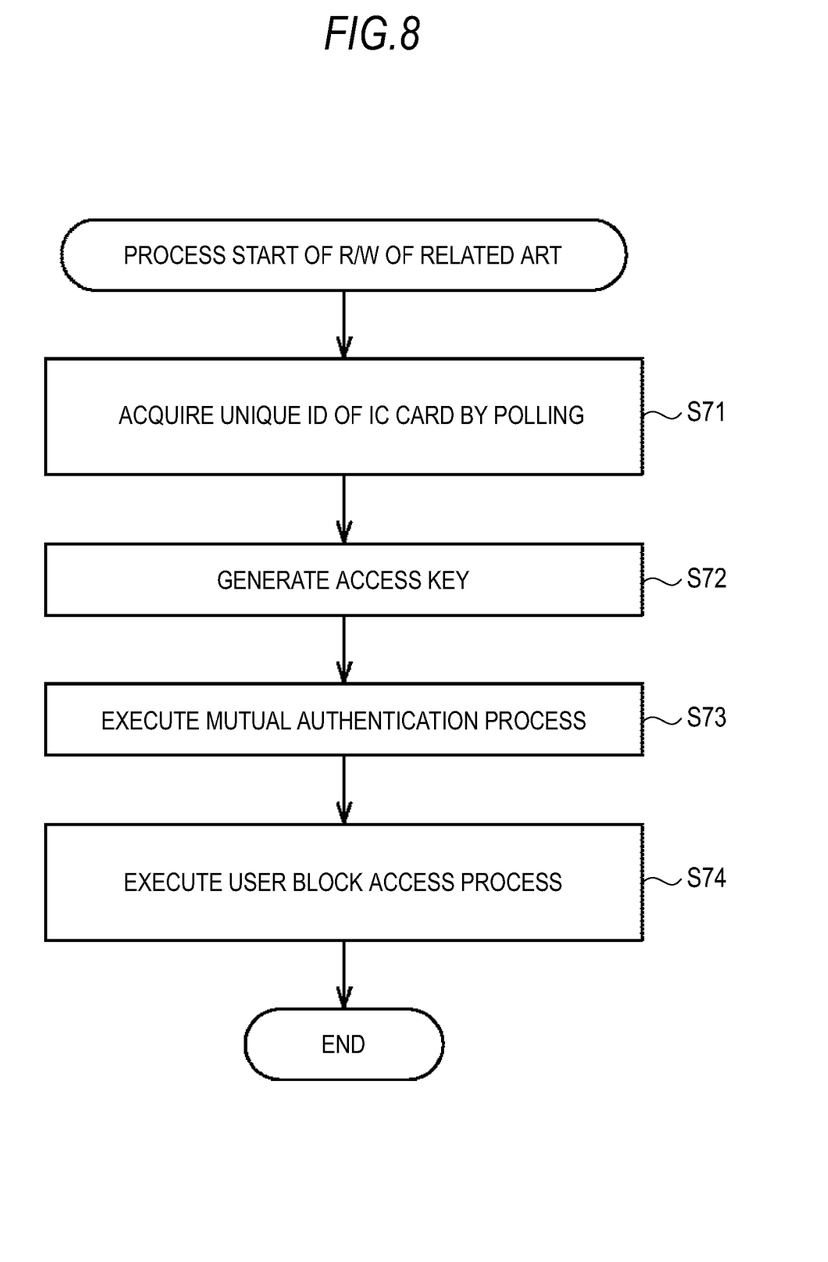
FIG. 8 is a flowchart illustrating a process of an R/W of the related art.

Next, the process of an R/W of the related art which communicates with the IC card 20 will be described in detail. FIG. 8 is a flowchart illustrating the process of the R/W of the related art. In the IC card 20 communicable with the R/W of the related art, its target ID randomization flag is assumed to be invalid.

In step S71, the R/W of the related art performs polling, and a target ID (card-specific ID) is acquired from the IC card 20 moving toward the R/W of the related art.

In step S72, the R/W of the related art generates an access key by applying 6 bytes of a card number of the acquired target ID (card-specific ID) as an input parameter of an individualization code to a degenerate key held in advance.

In step S73, the R/W of the related art executes a mutual authentication process with the IC card 20 using the generated access key. After the mutual authentication process has succeeded, a user block access process is executed in step S74. Then, the process of the R/W of the related art is ended.

The IC card 20 is also wirelessly communicable with the R/W of the related art by setting the target ID randomization flag of the IC card 20 to be invalid as described above.

The information processing device of the exemplary embodiment of the present disclosure is also applicable to a mobile phone or the like equipped with an IC chip equivalent to the IC card 20 as well as the IC card 20 in this embodiment.

The communication system of the exemplary embodiment of the present disclosure is applicable to any communication system which executes a mutual authentication process as well as the non-contact communication system 1 in this embodiment.

On the other hand, a series of processes described above may be executed by hardware and may also be executed by software. When the series of processes are executed by software, a program constituting the software is installed from a program recording medium on a computer built in dedicated hardware or, for example, a general-purpose personal computer capable of executing various functions by installing various programs.

A program to be executed by the computer may be a program to be processed in a time series manner according to a sequence described herein or may be a program to be processed in parallel or at a time when invoked, for example.

A program may be processed by one computer, or alternatively may be processed by a plurality of computers by distributed processing. The program may also be transferred to and executed by a remote computer.

In this specification, the system represents the entirety of an apparatus including a plurality of devices.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising:
   a processor;
   a communication section; and
   a memory device operatively coupled to the processor, the memory device storing instructions that cause the processor, in cooperation with the communication section and the memory device, to:
   (a) determine whether a target ID is a unique ID or a partial randomization ID based on a code included within the target ID, the partial randomization ID including:
      (i) a first part being replaced by a different number; and
      (ii) a second part being generated based on the unique ID;
   (b) in response to the target ID being the partial randomization ID, generate an access key based on the second part of the partial randomization ID and a key; and
   (c) execute a mutual authentication process using the generated access key.

2. The information processing apparatus of claim 1, wherein the information processing apparatus is a reader/writer.

3. The information processing apparatus of claim 1, wherein the information processing apparatus is a non-contact communication IC card.

4. The information processing apparatus of claim 1, wherein the instructions cause the processor to determine whether the target ID is the unique ID or the partial randomization ID based on a randomization flag.

5. The information processing apparatus of claim 4, wherein the randomization flag is set prior to generating the target ID.

6. The information processing apparatus of claim 1, wherein:
   (a) the code includes at least 1 byte of the target ID; and
   (b) the instructions cause the processor to determine which bytes of the target ID correspond to the first part based on the code.

7. The information processing apparatus of claim 1, wherein the different number is randomly generated.

8. The information processing apparatus of claim 7, wherein the instructions cause the processor to change the randomly generated different number.

9. The information processing apparatus of claim 1, wherein the second part of the partial randomization ID includes a part of the unique ID.

10. The information processing apparatus of claim 1, wherein the instructions cause the processor to, in response to the target ID being the partial randomization ID, generate the access key by applying the second part of the partial randomization ID to the key.

11. The information processing apparatus of claim 10, wherein applying the second part of the partial randomization ID to the key includes adding the second part of the partial randomization ID to the key.

12. The information processing apparatus of claim 1, wherein the instructions cause the processor to, in response to the target ID being the unique ID, generate the access key by applying the unique ID to the key.

13. The information processing apparatus of claim 1, wherein the instructions cause the processor to determine how many of the bytes of the target ID correspond to the first part based on the code.

14. A method of operating an information processing apparatus including instructions, the method comprising:
   (a) causing a processor to execute the instructions to determine whether a target ID is a unique ID or a partial randomization ID based on a code included within the target ID, the partial randomization ID including:
      (i) a first part being replaced by a different number; and
      (ii) a second part being generated based on the unique ID;
   (b) causing the processor to execute the instructions to, in response to the target ID being the partial randomization ID, generate an access key based on the second part of the partial randomization ID and a key; and
   (c) causing the processor to execute the instructions to execute a mutual authentication process using the generated access key.

15. The method of claim 14, wherein the information processing apparatus is a reader/writer.

16. The method of claim 14, wherein the information processing apparatus is a non-contact communication IC card.

17. The method of claim 14, which includes causing the processor to execute the instructions to determine whether the target ID is the unique ID or the partial randomization ID based on a randomization flag.

18. The method of claim 14,
   (a) wherein the code includes at least 1 byte of the target ID; and (b) the method further includes causing the processor to execute the instructions to determine which bytes of the target ID correspond to the first part based on the code.

19. The method of claim 14, wherein the different number is randomly generated.

20. The method of claim 19, which includes causing the processor to execute the instructions to change the randomly generated different number.

21. The method of claim 14, wherein the second part of the partial randomization ID includes a part of the unique ID.

22. The method of claim 14, which includes causing the processor to execute the instructions to, in response to the target ID being the partial randomization ID, generate the access key by applying the second part of the partial randomization ID to the key.

23. The method of claim 22, wherein applying the second part of the partial randomization ID to the key includes adding the second part of the partial randomization ID to the key.

24. The method of claim 14, which includes causing the processor to execute the instructions to, in response to the target ID being the unique ID, generate the access key by applying the unique ID to the key.

25. A computer readable memory device storing instructions to cause an information processing apparatus to:
  (a) determine whether a target ID is a unique ID or a partial randomization ID based on a code included within the target ID, the partial randomization ID including:
    (i) a first part being replaced by a different number; and
    (ii) a second part being generated based on the unique ID;
  (b) in response to the target ID being the partial randomization ID, generate an access key based on the second part of the partial randomization ID and a key; and
  (c) execute a mutual authentication process using the generated access key.

* * * * *